(12) United States Patent
Humbach

(10) Patent No.: US 11,231,542 B2
(45) Date of Patent: Jan. 25, 2022

(54) LIGHT DEFLECTION DEVICE, METHOD FOR MANUFACTURING A LIGHT DEFLECTION DEVICE AND ILLUMINATION DEVICE

(71) Applicant: Oliver Humbach, Dortmund (DE)

(72) Inventor: Oliver Humbach, Dortmund (DE)

(73) Assignee: temicon GmbH, Dortmund (DE)

( * ) Notice: Subject to any disclaimer, the term of this patent is extended or adjusted under 35 U.S.C. 154(b) by 69 days.

(21) Appl. No.: 16/376,775

(22) Filed: Apr. 5, 2019

(65) Prior Publication Data

US 2019/0302349 A1 Oct. 3, 2019

Related U.S. Application Data

(63) Continuation of application No. PCT/EP2017/075218, filed on Oct. 4, 2017.

(30) Foreign Application Priority Data

Oct. 5, 2016 (DE) ...................... 10 2016 118 885.9

(51) Int. Cl.
| | |
|---|---|
| *F21V 8/00* | (2006.01) |
| *F21S 43/239* | (2018.01) |
| *F21S 43/245* | (2018.01) |
| *B29D 11/00* | (2006.01) |

(52) U.S. Cl.
CPC ...... *G02B 6/0061* (2013.01); *B29D 11/00663* (2013.01); *F21S 43/239* (2018.01); *F21S 43/245* (2018.01); *G02B 6/005* (2013.01); *G02B 6/0035* (2013.01)

(58) Field of Classification Search
CPC ... G02B 6/0036; G02B 6/0043; G02B 6/0065
See application file for complete search history.

(56) References Cited

U.S. PATENT DOCUMENTS

| | | | | |
|---|---|---|---|---|
| 5,396,350 A | * | 3/1995 | Beeson ................ | G02B 6/0053 349/62 |
| 6,425,675 B2 | * | 7/2002 | Onishi ..................... | F21V 5/02 362/607 |
| 6,846,089 B2 | * | 1/2005 | Stevenson .............. | G02B 5/045 362/627 |
| 10,317,609 B2 | * | 6/2019 | Lee ........................ | G02B 6/005 |
| 10,663,638 B2 | * | 5/2020 | Lee ...................... | H04N 13/356 |

(Continued)

FOREIGN PATENT DOCUMENTS

| | | |
|---|---|---|
| CN | 110366657 A | 10/2019 |
| DE | 10 2014 200 369 | 7/2015 |

(Continued)

*Primary Examiner* — Andrew J Coughlin
(74) *Attorney, Agent, or Firm* — Reinhart Boerner Van Deuren P.C.

(57) ABSTRACT

A light deflection device including a flat, transparent light guide and a microstructure provided at least in regions on the light guide for decoupling light coupled into the light guide. The microstructure has microstructure elements and the microstructure elements in each case have a substantially point-like or line-like geometry for contact with the light guide. Further, a method for manufacturing a light deflection device, an illumination device, and use of a light deflection device or an illumination device are disclosed.

20 Claims, 7 Drawing Sheets

(56) References Cited

U.S. PATENT DOCUMENTS

| | | |
|---|---|---|
| 2007/0058391 A1 | 3/2007 | Wilson et al. |
| 2007/0223247 A1 | 9/2007 | Lee et al. |
| 2007/0279933 A1 | 12/2007 | Shiau et al. |
| 2008/0198295 A1 | 8/2008 | Yuuki et al. |
| 2008/0303180 A1 | 12/2008 | Lee et al. |
| 2011/0163066 A1 | 7/2011 | Choi et al. |
| 2011/0244187 A1 | 10/2011 | Rinke |
| 2015/0029744 A1* | 1/2015 | Van Ostrand .......... G02B 5/045 362/606 |
| 2017/0131452 A1* | 5/2017 | Tarsa .................... G02B 6/0021 |
| 2019/0377123 A1* | 12/2019 | Boerner ................ G02B 6/0055 |

FOREIGN PATENT DOCUMENTS

| | | |
|---|---|---|
| JP | Hei08-221013 A | 8/1996 |
| JP | 2000-249836 A | 9/2000 |
| JP | 2002-116441 A | 4/2002 |
| WO | WO 2011/124764 | 10/2011 |

* cited by examiner

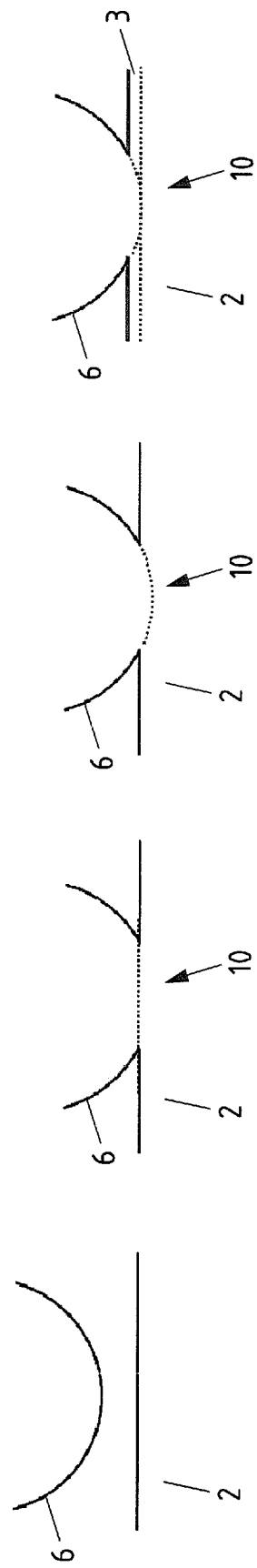

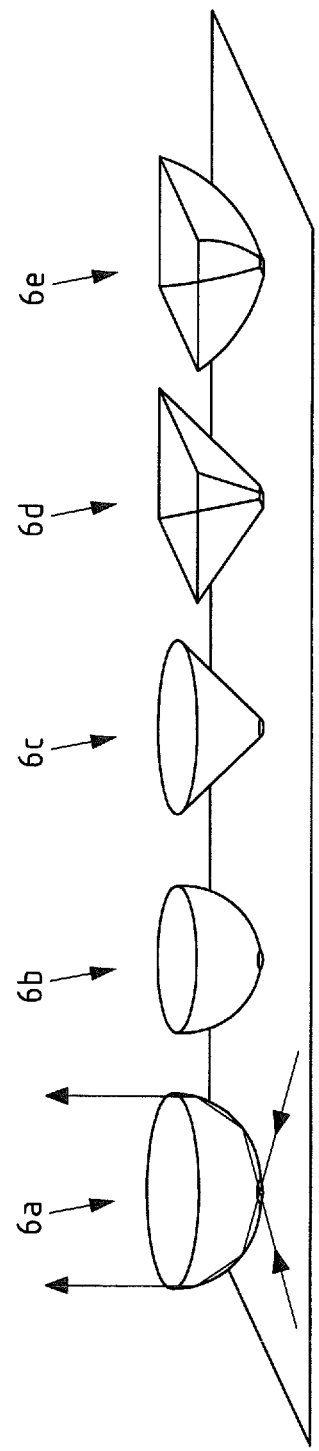

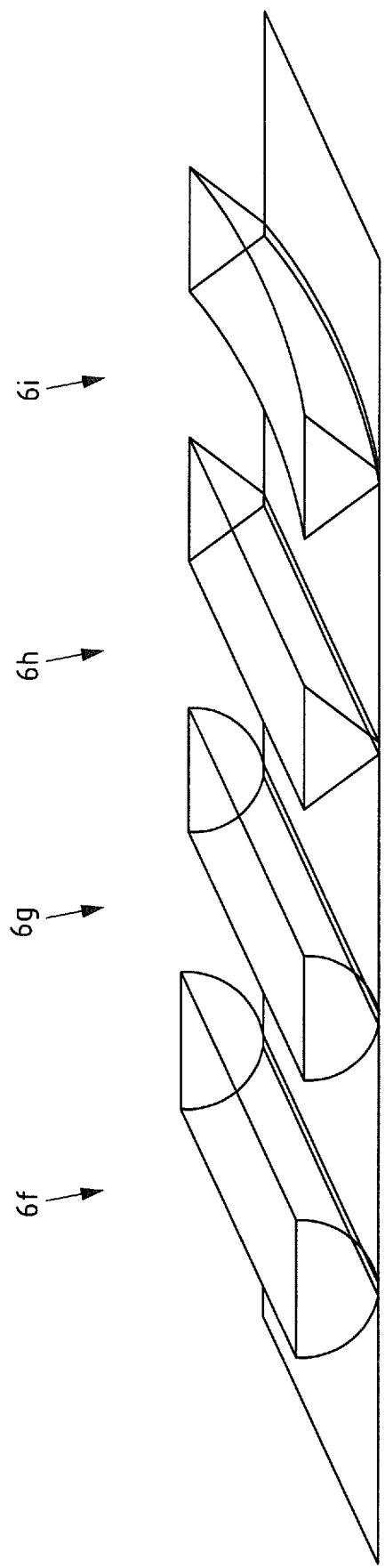

LIGHT DEFLECTION DEVICE, METHOD FOR MANUFACTURING A LIGHT DEFLECTION DEVICE AND ILLUMINATION DEVICE

CROSS-REFERENCE TO RELATED PATENT APPLICATION

This patent application is a continuation of PCT/EP2017/075218, filed Oct. 4, 2017, which claims priority to German Application No. 10 2016 118 885.9, filed Oct. 5, 2016, the entire teachings and disclosure of which are incorporated herein by reference thereto.

FIELD

The invention relates to a light deflection device, comprising a flat, transparent light guide and a microstructure provided at least in regions on the light guide for decoupling light coupled into the light guide. The invention further relates to a method for manufacturing a light deflection device, an illumination device and a use of a light deflection device or illumination device.

BACKGROUND

Lamps generally consist of one or a plurality of light sources, which emit the generated light in a very large angular range. In order to limit and adapt the desired emission angle range, either reflecting elements or transparent elements deflecting the beam by refraction are required. Reflecting elements generally consist of metallic reflectors or reflectors coated with metal layers, whose geometry is suitable for accordingly deflecting beams coming from the light source. Transmitting elements have surface modulations, which deflect the beams as desired according to the principle of refraction. However, in both cases, a not insignificant construction depth is required. In addition, such light elements are not transparent.

Lamps are also known from the prior art which function on the principle of light delivery in a light guide on the basis of total internal reflection. The light, which was previously coupled in by an illumination source, is guided into them. The light is decoupled again via one or both surfaces of the flat sides of the light guide. In order to achieve the decoupling, the surface must, however, be processed either by a light scattering material being (partially) applied to the surface (e.g. by imprinting) or by the surface partially having irregularities (e.g. by impressions or by treatment of the surface with laser beams). Both variants have the disadvantage that the transparency may be impaired by the surface modulation and that a preferred decoupling of the light to one side is very difficult. A preferred perpendicular light decoupling is also difficult to achieve with such solutions. A light deflection to the surface normal is possible with grid structures, which decouple the light owing to diffraction, but undesired colour effects result in this case.

In the case of a sensitive microstructure, they must also be protected against dirt and damage. To this end, it is necessary to provide an additional protective layer which is applied to the microstructure. Alternatively, it is conceivable to protect the microstructure by the light guide with the surface comprising the microstructure being introduced spaced apart in an intermediate space (for example multiple glazing). However, this means an additional space requirement and outlay for the installation.

Light guide technology was intensively tested and further developed in particular for the application field of flat display technology for backlighting of displays on the basis of light crystals working in transmission. The object in flat display technology is also a thin structure and the efficient decoupling of light from the light guide. The emission only to one side and preferably in the direction of the surface normal is, however, not necessary here since generally a reflector is positioned behind the light guide and beam-forming and homogenising optical films in front of the light guide.

A method is for example known from US 2011/0244187 A1 to manufacture an optical model such that light of a light source can be used as the front illumination or back illumination for an electronic device. The structure impressed on a film has structural elements, which always have flat geometries for contact with the light guide.

A further application field of light guides are solar energy devices, in which the light coupling is used to efficiently couple light into a light guide in a reverse light direction from outside via a surface structure. A laminated structure is thus for example known from WO 2011/124764 A1 such that optically functional cavities are formed. The structural elements of the film applied to the light guide also always have flat geometries here for contact with the light guide.

Furthermore, in the case of large-area light guides, which are supposed to serve as an illumination device, the additional problem is posed of decoupling the light as evenly as possible over a large surface.

In addition, the problem is frequently posed of wishing to adapt the emission characteristic of the illumination device. However, this can usually only be achieved by complex adaptation of the microstructure being carried out.

Furthermore, there is thus the need, in particular to provide large-area illumination devices with a flat structure, which emit light efficiently and preferably to one side as close to perpendicular as possible. They should be as insensitive as possible, for example to deposits of dust and physical effects. In this case, the light element should be clearly transparent in order to be able to be used as flexibly as possible and to enable inspection in the switched-off and in the switched-on state. In this case, the simplest possible adaptation of the emission or decoupling characteristics should be enabled.

Against this background, the invention is therefore set the object of proposing a light deflection device, an illumination device, a manufacturing method and a use, by means of which the indicated problems can be at least partially reduced or remedied.

BRIEF SUMMARY

According to a first aspect of the invention, the object is achieved in the case of a generic light deflection device comprising a flat, transparent light guide and a microstructure provided at least in regions on the light guide for decoupling light coupled into the light guide, such that the microstructure has microstructure elements and the microstructure elements in each case have a substantially point-like or line-like geometry for contact with the light guide.

In contrast to the previous approaches in the prior art, as a result of the microstructure elements of the microstructure in each case providing a substantially point-like or line-like geometry for contact with the light guide, it can, on the one hand, be achieved that, if necessary, only a comparatively small region of the surface of the light guide is used for decoupling light. Due to the substantially point-like or line-like geometry, the microstructure elements thus have a substantially point-like geometry viewed in cross-section in the contact region to the light guide. As a result, in particular long light paths can be implemented in the light guide and homogeneous light decoupling can also be achieved for large-area light guides. It has also been shown that high transparency and specific emission characteristics can be achieved.

The geometry provided by the microstructure elements does not necessarily have to correspond to the effective contact region or opening region between the microstructure elements and the light guide since it can be modified, in particular widened for example by an additional bonding layer. However, this enables a flexible adaptation of the size of the effective contact region between the microstructure elements and the light guide. Since the effective contact region can be expanded in a defined manner by the substantially point-like or line-like geometry of the microstructure elements initially provided in the region of the light guide caused by the connection technique of the microstructure elements with the light guide. In one example, the microstructure elements are adapted to the planar light guide surface in the case of connection in the contact region which can for example be achieved by thermally activated or not fully cross-linked (sticky) surface layer of the microstructure elements. In a further example, the microstructure elements are impressed into the planar light guide surface, which can for example be achieved by a thermally activated or not fully cross-linked (sticky) surface layer of the light guide. In a further example, the effective contact region can be modified by immersing the microstructure elements at different depths into the additional bonding layer such that the effective contact region can also be variably adjusted without a geometry change of the microstructure elements themselves. For example, the width of the effective contact region (expanded in a defined manner) of the microstructure elements with the light guide in the region of the substantially point-like or line-like geometry viewed in cross-section is at most 20 µm, preferably at most 10 µm, further preferably at most 5 µm wide.

Proceeding from the substantially point-like or line-like geometry of the region of the microstructure elements facing the light guide, the microstructure elements preferably widen viewed in cross-section at least in sections in the direction facing away from the light guide.

The microstructure elements can for example be in direct contact or indirect contact (for example via a bonding layer) with the light guide. The microstructure is preferably connected in a materially-bonded manner to the light guide.

A microstructure is in particular understood as a specific structure, whose characteristic dimensions are in the micrometer range, that is to say, in the range below 1 mm. Since the microstructure ensures light decoupling, the microstructure can also be designated as a micro-optical structure.

A flat, transparent light guide is in particular understood as a component, which can transport light over certain paths. The light guidance is in this case achieved by reflection, for example by total reflection on the boundary surface of the light guide. The light guide here for example has a refractive index which is higher than that of the medium surrounding the light guide. Light is understood as the part of the electro-magnetic emission visible to the eye, that is to say electro-magnetic emission with wavelengths of roughly 380 nm to 780 nm or a part thereof. For example, the light guide is formed as a square, in particular rectangular disc.

The light guide has preferably substantially plane-parallel surfaces. The light guide consists for example of glass or plastic. A light guide made of glass has high hardness and resistance. In addition, glass is already used in any case in many structural elements, such as for example windows or cabinets. Such light guides can easily be provided with a microstructure by applying the decoupling layer. Light guides made of plastic can also have high resistance. Examples of a plastic are polymethylmethacrylate (PMMA), polycarbonate (PC), cyclic olefin copolymer (COC), polyurethane (PU), polysiloxane, such as polydimethylsiloxane (PDMS) or liquid silicone (LSR=liquid silicone rubber). For example, the light guide has a thickness of at least 0.2 mm, preferably at least 0.5 mm, further preferably at least 1 mm and/or a thickness of at most 15 mm, preferably at most 10 mm, further preferably at most 8 mm.

A medium with a lower refractive index than that of the material of the microstructure elements is preferably located between the microstructure elements of the microstructure. For example, a gaseous medium, preferably air, is located between the microstructure elements. For example, the refractive index of the medium is less than 1.3, preferably less than 1.2, further preferably less than 1.1.

The microstructure provided at least in regions on the light guide can for example be provided in only one partial region or completely on the light guide. The microstructure is preferably applied to the light guide, for example by means of a cover layer.

According to a preferred configuration of the light deflection device according to the invention, it further comprises a transparent cover layer applied flat at least in regions on the light guide, with the microstructure being provided between the cover layer and the light guide. The microstructure can for example be protected against soiling and damage by the cover layer. The microstructure can in this case be formed by the cover layer, by the light guide, by additional elements or a combination thereof.

The cover layer can essentially be formed as a plate or board. However, the cover layer is preferably formed as a film. A film is in particular understood as a thin layer (in particular with a thickness of less than 1 mm) made of the respective material (for example plastic). For example, the film can be wound. In this case, however, the film advantageously still has sufficient strength to fulfil for example the function of a protective layer as the outer layer.

For example, the cover layer consists at least partially of glass or a plastic. It has been found that configurations of the cover layer can be advantageously manufactured from glass or a plastic. A plastic has been shown to be advantageous in particular in the case of the formation of the cover layer as a film. A plastic can in particular be a transparent, thermoplastic material. The plastic is for example polymethylmethacrylate (PMMA), polycarbonate (PC), cyclic olefin copolymer (COC), polyurethane (PU), polysiloxane, such as polydimethylsiloxane (PDMS) or liquid silicone (LSR=liquid silicone rubber). However, it is also conceivable for the cover layer to be manufactured from a transparent epoxy resin or acrylate.

For example, the cover layer has a thickness of at most 1000 µm, preferably at most 500 µm, further preferably at most 300 µm and/or a thickness of at least 50 µm, preferably at least 100 µm, further preferably at least 150 µm.

According to a preferred configuration of the light deflection device according to the invention, the cover layer has the microstructure for decoupling light coupled into the light guide on the surface facing the light guide. The cover layer can thus advantageously serve as a support for the microstructure elements of the microstructure. In this case, the microstructure elements are preferably formed integrally with the cover layer. The surface of the cover layer opposite the microstructure is preferably substantially flat. The flat surface runs in particular substantially parallel to the surfaces of the flat light guide. The substantially flat surface of the cover layer can in particular constitute an outer side of the light deflection device and in this respect can constitute the outer protective layer or make an additional protective layer dispensable.

According to a preferred configuration of the light deflection device according to the invention, at least a part (preferably all) of the microstructure elements of the microstructure are formed by separate microbodies. For example, the microstructure elements of the microstructure are formed exclusively by microbodies introduced between light guide and cover layer. The microbodies can provide the geometry of microstructure already described. For example, the microbodies are formed in a ball-shape or cylindrically. The microbodies are preferably not formed integrally with a provided cover layer, but can be embedded into it and/or connected to it in a materially-bonded manner. For example, the microbodies are embedded up to at least 10%, preferably at least 30%, further preferably at least 50% of their extent in the cover layer. This allows a connection of the microbodies with the cover layer, which is advantageous in a mechanical and optical respect.

According to a preferred configuration of the light deflection device according to the invention, at least a part of the microstructure elements of the microstructure are impressed into the light guide. The light guide is deformed for example in the respective regions. As a result, the microstructure elements in the region of the substantially point-like or line-like geometry for contact with the light guide can be impressed at least partially into the surface of the light guide facing the microstructure, which can for example be achieved by a thermally activated or not fully cross-linked (sticky) surface layer of the light guide. Depending on the depth of the impression, the optical properties of the light deflection device can be modified.

According to a preferred configuration of the light deflection device according to the invention, at least a part (preferably all) of the microstructure elements of the microstructure are connected to the light guide by means of a bonding layer. For example, the bonding layer is provided over the entire area or in regions on the light guide. For example, the bonding layer is or comprises an adhesive, for example a glue or a (hardenable) varnish. The mechanical and optical connection between the light guide and the microstructure can be improved by the bonding layer.

The bonding layer preferably influences the optical properties of the light deflection device in the resulting contact region between microstructure and light guide. For example, the substantially point-like or line-like geometry initially provided by the microstructure elements for contact with the light guide is modified by the bonding layer to a flat bonding. To this end, the microstructure elements are preferably immersed at least partially into the bonding layer.

According to a preferred configuration of the light deflection device according to the invention, at least a part (preferably all) of the microstructure elements of the microstructure are curved convexly at least in sections viewed in cross-section. One or a plurality of internal total reflections of the light to be decoupled can advantageously be achieved thereby such that decoupling of light coupled into the light guide is achieved transversely (in particular substantially perpendicular) to the surface of the light guide.

If the microstructure elements in each case have a substantially point-like geometry in the contact region with the light guide, the microstructure elements are for example formed in a spherically lenticular manner, aspherically lenticular manner or dome-shaped. If the microstructure elements in each case have a substantially line-like geometry in the contact region with the light guide, the microstructure elements are for example formed in a cylinder lenticular manner, in particular with spherical or aspherical cross-section.

According to a preferred configuration of the light deflection device according to the invention, at least a part of the microstructure elements of the microstructure are formed in a straight line at least in sections viewed in cross-section. If the microstructure elements in each case have a substantially point-like geometry in the contact region with the light guide, the microstructure elements can for example be formed conically or pyramid-shaped. If the microstructure elements in each case have a substantially line-like geometry in the contact region with the light guide, they can for example be formed in a rod prism shape.

According to a preferred configuration of the light deflection device according to the invention, the substantially line-like geometry for contact with the light guide runs in a straight line at least in sections or curved at least in sections. The emission characteristics can for example be influenced by a curved line-like course or the decoupling can be influenced by light coupled obliquely into the light guide.

According to a preferred configuration of the light deflection device according to the invention, the microstructure is formed for decoupling light coupled into the light guide at least partially by means of at least one total reflection inside the microstructure elements. The total reflection can be achieved by corresponding selection of geometry and material. As a result, the light, after it has passed over the contact region between light guide and microstructure element into the corresponding microstructure element, is deflected largely on the basis of a total reflection. This in turn enables, in addition to high efficiency, a substantially perpendicular decoupling to the light guide surface. The fact that the light is decoupled largely or primarily in this manner is in particular understood as at least 50%, preferably at least 80%, further preferably at least 90% of the decoupled light being decoupled based on total reflection in the microstructure elements.

According to a preferred configuration of the light deflection device according to the invention, the microstructure is designed for decoupling light coupled into the light guide transversely to the surface of the light guide. Customised light distributions or light distribution curves can be achieved by the geometric shape of the microstructure elements. For example, a focal point of the distribution of the decoupled light in the desired direction(s) is, for example substantially perpendicular (that is to say substantially in the direction of the surface normal) or at a determined angle (for example +30° and/or −30°) to the surface normal. The majority of the decoupled light is preferably decoupled into the desired direction(s). For example, the majority (for example at least 50%, preferably at least 80%, further preferably at least 90%) of the decoupled light is emitted in an angular range of at most 30°, preferably at most 20°, further preferably at most 10° around the desired direction(s).

According to a preferred configuration of the light deflection device according to the invention, the microstructure elements of the microstructure have at least in sections a substantially constant or varying arrangement density. The structural elements can for example be arranged consistently or randomly distributed in the case of a (at a macroscopic level) substantially constant arrangement density. The microstructure can be manufactured particularly economically through a substantially constant arrangement density. The error-proneness in relation to incorrect positioning is also reduced for applying the decoupling layer to the light guide. The emission characteristics can be specifically influenced by a (at the macroscopic level) varying arrangement density. As a result, a decreasing light quantity caused by the decoupling along the light guide can for example be taken into account and in particular compensated.

According to a second aspect of the invention, the object mentioned at the outset is achieved by a method for manufacturing a light deflection device, in particular a light deflection device according to the invention, with the method comprising the steps: providing a flat, transparent light guide and providing the light guide with a microstructure for decoupling light coupled into the light guide, with the microstructure having microstructure elements and with the microstructure elements in each case having a substantially point-like or line-like geometry for contact with the light guide.

As already mentioned, in contrast to the previous approaches in the prior art, long light paths can in particular be achieved in the light guide in the case of high transparency by a substantially point-like or line-like geometry of the microstructure elements in the contact region with the light guide. To this end, a flexible adaptation of the size of the effective contact region or opening region between the microstructure elements and the light guide can be enabled since the substantially point-like or line-like geometry of the microstructure elements facing the light guide can be modified somewhat by immersing the microstructure elements at different depths into an additional bonding layer such that the effective contact region can be variably adjusted without a geometry change of the microstructure elements themselves.

The microstructure is preferably applied on the light guide by means of an additional layer, for example a plate or film and as a result provided with the microstructure.

According to one preferred configuration of the method according to the invention, the method further comprises: Applying a flat, transparent cover layer at least in regions on the light guide, with the microstructure being provided between the light guide and the cover layer. The cover layer can advantageously protect the microstructure from damage and soiling. The microstructure is preferably provided on the cover layer, for example applied to it or formed integrally with it. The cover layer can then be applied together with the cover layer on the light guide.

For example, the microstructure is formed by replicating an original shape, which has a negative of the microstructure, on the cover layer. The replication is carried out for example by UV embossing, thermal embossing or extrusion. For example, a roll to roll process or a roll to plate process is used. The original shape (for example a roll or plate) is preferably manufactured by lithography, in particular UV lithography, laser lithography or lithography with a subsequent etching process, micro cutting or laser ablation.

According to a preferred configuration of the method according to the invention, the microstructure elements of the microstructure are provided by separate microbodies, which are arranged between the cover layer and the light guide. For example, the microbodies are applied on the light guide and the cover layer is subsequently applied to the light guide provided with microbodies. Alternatively, however, the cover layer can also be provided with microbodies. The cover layer provided with microbodies can subsequently be applied to the light guide.

For example, the microbodies are embedded into the cover layer and/or connected to it in a materially-bonded manner. For example, the microbodies are embedded up to at least 10%, preferably at least 30%, further preferably at least 50% of their extent in the cover layer (running perpendicular to the light guide). This allows a connection of the microbodies with the cover layer, which is advantageous in a mechanical and optical respect.

According to a preferred configuration of the method according to the invention, the provision of the light guide with the microstructure includes at least partially adapting at least a part of the microstructure elements in the region of the substantially point-like or line-like geometry to the light guide. In this case, the respective microstructure element is for example adapted to the point-like or line-like geometry on the flat surface of the light guide. This can for example be achieved by a thermally activated or not fully cross-linked (sticky) surface layer of the microstructure elements. Depending on the degree of adaptation, the optical properties of the light deflection device can be modified.

According to a preferred configuration of the method according to the invention, the provision of the light guide with the microstructure includes at least partially impressing at least a part of the microstructure elements in the light guide. In this case, the respective microstructure element with the point-like or line-like geometry is for example impressed into the flat surface of the light guide. This is for example achieved by a thermally activated or not fully cross-linked (sticky) surface layer of the light guide. Depending on the depth of the impression, the optical properties of the light deflection device can be modified.

According to one preferred configuration of the method according to the invention, the method further comprises: Applying a bonding layer on the light guide, with the provision of the light guide with the microstructure on the light guide including at least partially immersing at least a part of the microstructure elements into the bonding layer.

The bonding layer is preferably an adhesive, for example a glue or a (hardenable) varnish. A hardenable bonding layer can for example be chemically or thermally hardenable by means of UV radiation. For example, the bonding layer has a comparable or the same refractive index as the microstructure elements and/or the light guide.

As already mentioned, the effective contact region or opening region between the light guide and the respective structural element can be modified, in particular enlarged by the bonding layer and immersing the microstructure elements. In particular, the microstructure can be definitively immersed into the bonding layer such that a specific contact region and therefore a specific emission characteristic is adjusted.

According to a third aspect, the object mentioned at the outset is achieved by an illumination device, comprising a light deflection device according to the invention, and at least one illumination source arranged on at least one edge of the light guide for coupling in light via the edge of the light guide.

The illumination device can for example be considered as a transparent, disc-shaped illumination element. An illumination source can for example have one or a plurality of light sources, for example one or a plurality of light diodes (LEDs). For example, a strip made of a plurality of light sources (for example made of a plurality of LEDs) can be arranged along the edge of the light guide. For example, light diodes are provided for red, green, blue and/or white light.

The at least one illumination source is preferably applied at least in regions on an edge of the light guide, for example connected to the edge in a materially-bonded manner. This can in particular reduce losses when coupling in the light.

For example, the illumination device comprises a first illumination source arranged on a first edge of the light guide for coupling in light via the first edge of the light guide and at least one second illumination source arranged on a second edge of the light guide for coupling in light via the second edge of the light guide. The provision of a first and a second illumination source at different edges enables a homogeneous and flexible illumination by the illumination device. In order to further improve the adaptability and homogeneity of the illumination device, the illumination device can preferably also have further (for example a third, fourth or more) illumination sources arranged on a corresponding edge of the light guide for coupling in light via the corresponding edge of the light guide.

According to a fourth aspect of the invention, the object mentioned at the outset is achieved by a use of a light deflection device according to the invention or an illumination device according to the invention for a space-creating structural element, for a room light, for lamps outdoors, for lamps in vehicles or for display illumination. A space-creating structural element is for example understood as a (show) window (for example of a façade or a cabinet), a partition wall, a parapet, a storage area, an advertising space or a roof element. A window can in particular be a multiple insulation glazing (MIG), in the case of which one of the discs is or comprises a light deflection device according to the invention or an illumination device according to the invention.

It has been shown that the described light deflection device and the described illumination device are suitable for use for the described purpose, since in the case of such purposes of use high resistance is generally required in the case of substantially perpendicular light decoupling, and high efficiency of the illumination is also expected.

The exemplary configurations of the present invention previously described in this description should also be understood as being disclosed in all combinations with each other. In particular, exemplary configurations in relation to the different aspects should also be understood as being disclosed. A correspondingly manufactured light deflection device should also be disclosed for example by the description of method steps according to preferred embodiments of the method. Corresponding configurations of the method for manufacture should also be disclosed by the description of the light deflection device.

Further advantageous exemplary configurations of the invention can be inferred from the following detailed description of a number of exemplary embodiments of the present invention, in particular in connection with the figures. However, the figures are only intended to be used for illustration purposes and not to define the scope of protection of the invention. The figures are not true to scale and are simply intended to reflect in exemplary form the general concept of the present invention. In particular, features which are contained in the figures should in no way be considered as a necessary element of the present invention.

BRIEF DESCRIPTION OF THE DRAWINGS

In the drawing,

FIGS. 1C-1F show schematic cross-sectional representations to illustrate exemplary manufacturing methods of exemplary embodiments of light deflection devices according to the invention;

FIGS. 3A-3E show schematic perspective representations of different microstructure elements with substantially point-like geometry for contact with the light guide;

FIGS. 3F-3I show schematic perspective representations of different microstructure elements with substantially line-like geometry for contact with the light guide;

DETAILED DESCRIPTION

Figure 1B:
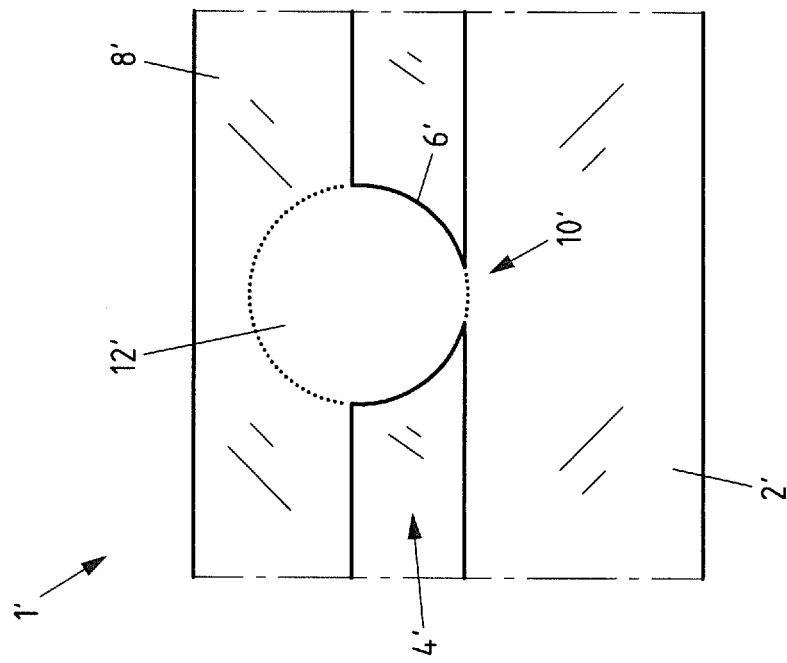
FIGS. 1A, 1B show schematic cross-sectional representations of exemplary embodiments of light deflection devices according to the invention.
Figure 1A:
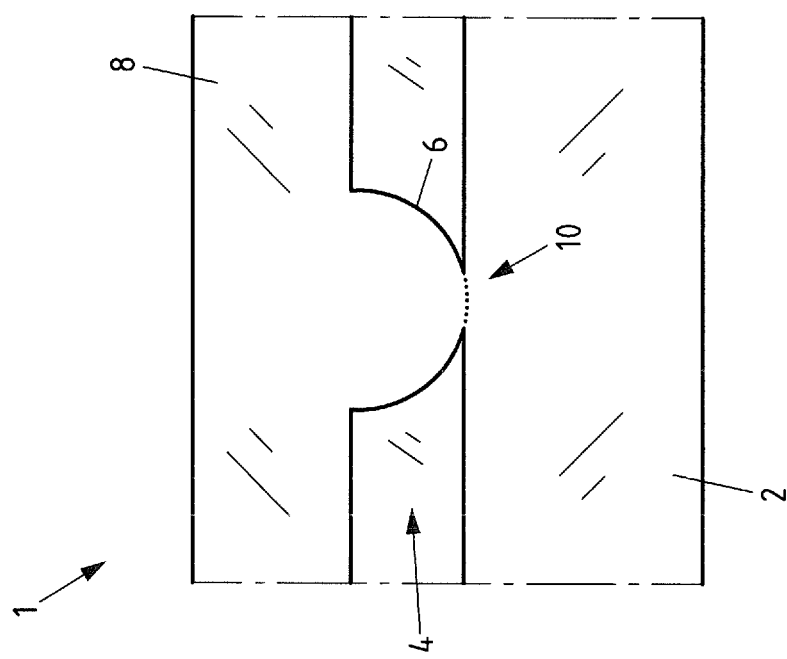

FIGS. 1A, 1B show firstly schematic cross-sectional representations of exemplary embodiments of light deflection devices according to the invention. FIG. 1a shows a light deflection device 1. The light deflection device comprises a flat, transparent light guide 2 and a microstructure 4 provided on the light guide 2 for decoupling light coupled into the light guide 2. For example, a microstructure element 6 of the microstructure is represented. The microstructure elements 6 have in each case firstly a substantially point-like or line-like geometry for contact with the light guide 2.

The light deflection device has a transparent cover layer 8 applied flat on the light guide 2. The microstructure 4 is provided between the cover layer 8 and the light guide 2. A medium with a lower refractive index than that of the microstructure elements 6, for example air, is provided between the microstructure elements. The cover layer 8 has the microstructure 4 for decoupling light coupled into the light guide 2 on the surface facing the light guide 2. The microstructure elements 6 are convexly curved at least in sections viewed in cross-section. In this case, the microstructure elements 6 are formed in a spherically lenticular manner.

In the contact region of the point-like or line-like geometry of the microstructure elements 6 with the light guide 2, a bonding layer (not represented) is provided such that an effective contact region or opening region 10 results, which is widened depending on the penetration depth of the microstructure elements 6 into the bonding layer.

FIG. 1B shows a further exemplary embodiment of a light deflection device 1'. The light deflection device 1' is similar to the light deflection device 1. Therefore, detail will only be given below on the differences. Unlike the light deflection device 1, the microstructure elements 6' of the microstructure 4' are formed by separate microbodies 12' in the case of the light deflection device 1'. The microbodies 12' are arranged between the cover layer 8' and the light guide 2'. The microbodies 12' are embedded into the cover layer 8' and connected to it in a materially-bonded manner. The microbodies 12' are embedded up to roughly 50% of their elongation in the cover layer 8'.

FIGS. 1C-1F show schematic cross-sectional representations to illustrate exemplary manufacturing methods of exemplary embodiments of light deflection devices according to the invention. In this case, the same reference numerals are used as in FIG. 1A. After a microstructure 4 with a plurality of microstructure elements 6, represented by way of example here, and a light guide 2 have been provided, the light guide 2 can be provided with the microstructure 4. The provision of the light guide 2 with the microstructure 4 can for example include at least partially adapting at least a part of the microstructure elements 6 to the light guide 2 (FIG. 1D). Alternatively, the provision of the light guide 2 with the microstructure 4 can include at least partially impressing at least a part of the microstructure elements 6 into the light guide 2 (FIG. 1E). Further alternatively, as already described, a bonding layer 3 can be applied on the light guide 2 and the provision of the light guide 2 with the microstructure 4 can include at least partially immersing at least a part of the microstructure elements 6 into the bonding layer 3 (FIG. 1F).

Figure 2B:
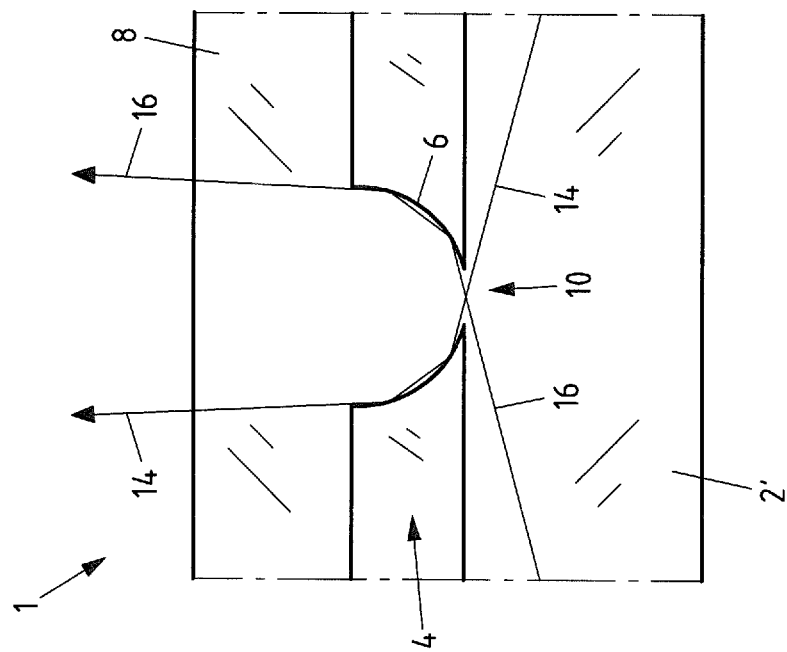
FIGS. 2A, 2B show schematic representations to illustrate the light decoupling through the exemplary embodiments from FIG. 1.
Figure 2A:
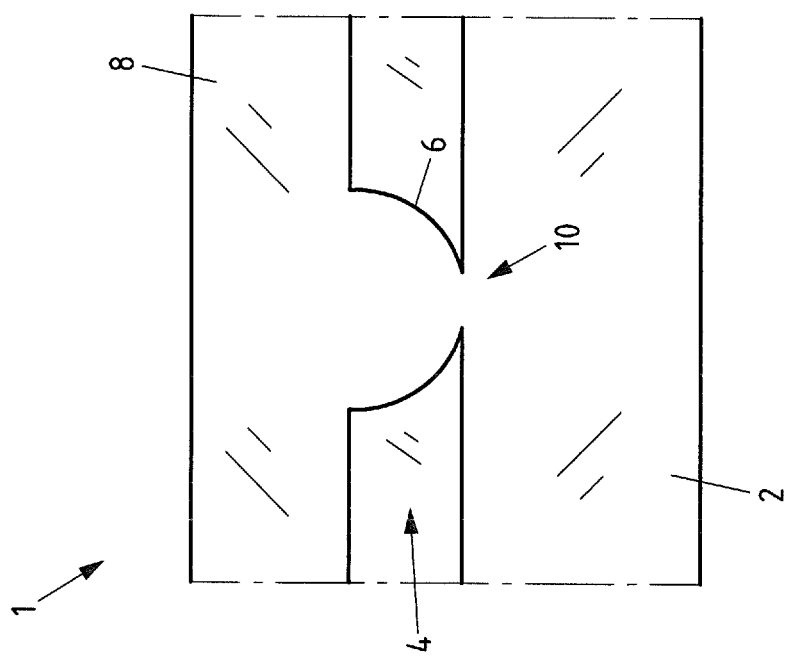

FIG. 2A, 2B now illustrate the light decoupling through the exemplary embodiments from FIGS. 1A, 1B. In this case, the light deflection device 1 from FIG. 1A is represented by way of example. However, the same applies for the light deflection device 1' represented in FIG. 1B. As already described, an effective contact region or opening region 10 results between light guide 2 and microstructure elements 6 through the bonding layer (not represented), which enables a transition of light coupled into the light guide 2 into the microstructure elements 6. Two light beams 14 and 16 are now represented in FIG. 2B by way of example, which are guided in the light guide 2 by means of total reflection and which are decoupled in the microstructure element 6 by means of total reflection. Light beam 14 enters through the opening region 10 and is totally reflected once on the edge of the microstructure element 6 before the light beam 14 is decoupled through the surface of the cover layer 8 opposite the microstructure 4. Light beam 16 also enters through the opening region 10 and is totally reflected twice on the edge of the microstructure element 6 before the light beam 16 is decoupled.

FIGS. 3A-3E now show schematic perspective representations of different microstructure elements 6a-6e with substantially point-like geometry for contact with the light guide. The decoupling of light beams already described in connection with FIG. 2B is represented by way of example in FIG. 3A.

The microstructure elements 6a, 6b, 6e represented in FIGS. 3A, 3B, 3E are convexly curved at least in sections viewed in cross-section, in this case both convexly viewed in cross-section. The microstructure element 6a is formed in a spherically lenticular manner, the microstructure element 6b is formed in an aspherically lenticular manner, the microstructure element 6e is formed dome-shaped. Alternatively, the microstructure elements can also be formed in a straight line at least in sections viewed in cross-section, as represented in FIGS. 3C, 3D. The microstructure element 6c is conical, the microstructure element 6d is formed in a pyramid-shape.

FIGS. 3F-3I now show schematic perspective representations of different microstructure elements 6f-6i with substantially line-like geometry for contact with the light guide. The microstructure elements 6f, 6g represented in FIGS. 3F, 3G are convexly curved at least in sections viewed in cross-section, in this case both convexly viewed in cross-section. The microstructure element 6f is formed in a spherically cylindrical lenticular manner, the microstructure element 6g is formed in an aspherically cylindrical lenticular manner. Alternatively, the microstructure elements can also be formed in a straight line at least in sections viewed in cross-section, as represented in FIGS. 3H, 3I. The microstructure elements 6h, 6i are for example formed in a rod prism shape. In this case, the substantially line-like geometry for contact with the light guide in the case of microstructure element 6h runs in a straight line, in the case of microstructure element 6i curved.

The described microstructure elements can for example be used in one of the described light deflection devices.

Figure 4B:
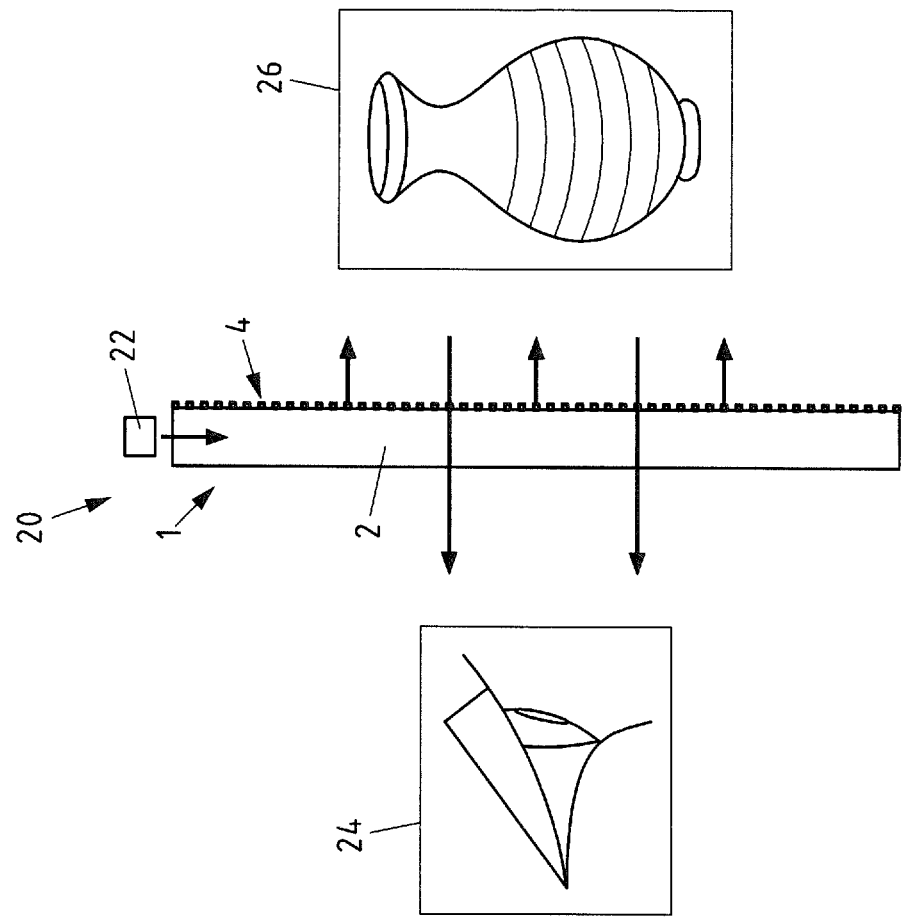
FIGS. 4A, 4B show a schematic representation of an exemplary embodiment of an illumination device according to the invention.
Figure 4A:
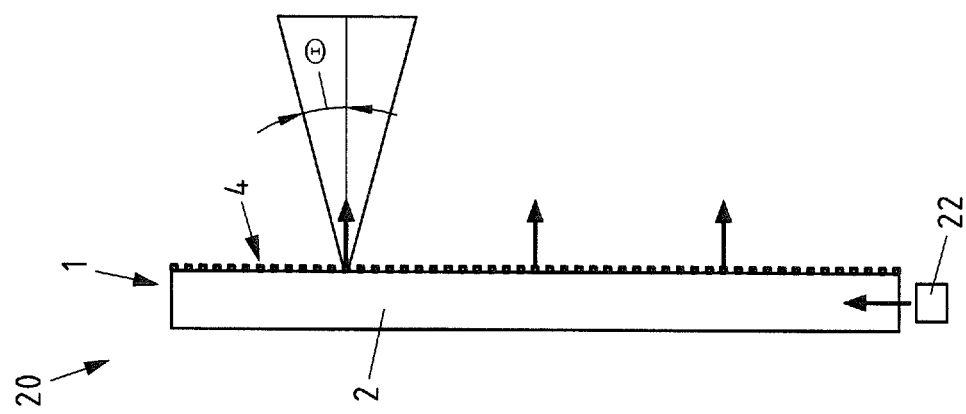

FIGS. 4A, 4B now show schematic representations of an exemplary embodiment of a illumination device 20 according to the invention. The illumination device 20 comprises a light deflection device 1. The light deflection device 1 represented by way of example can be one of the described light deflection devices. The illumination device further comprises at least one illumination source 22 arranged on at least one edge of the light guide 2 in the form of one or a plurality of LEDs for coupling in light via the edge of the light guide 2. The illumination source is arranged in FIG. 4a on the lower edge, in FIG. 4B on the upper edge. The light coupled in is decoupled substantially perpendicularly through the microstructure 4. That is to say that the majority of the decoupled light is decoupled within an angle Θ around the surface normal of the light guide, as represented in FIG. 4A. As a result, an observer 24 can for example observe optimally illuminated objects 26 arranged behind the illumination device 20.

The described light deflection devices can be manufactured by means of exemplary embodiments of the method according to the invention.

Figure 5A:
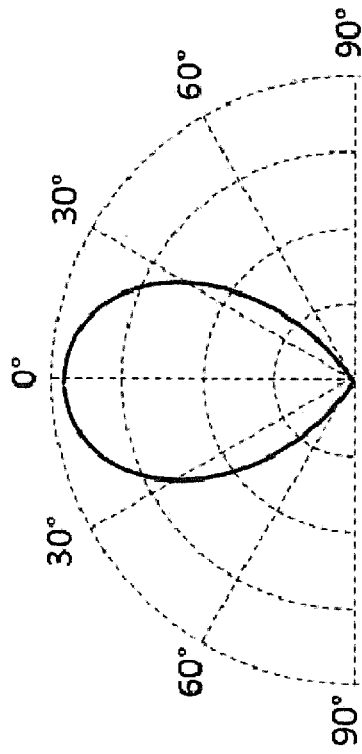
FIGS. 5A-5D show exemplary light distribution curves of the light decoupling by means of exemplary embodiments of the light deflection device according to the invention.
Figure 5B:
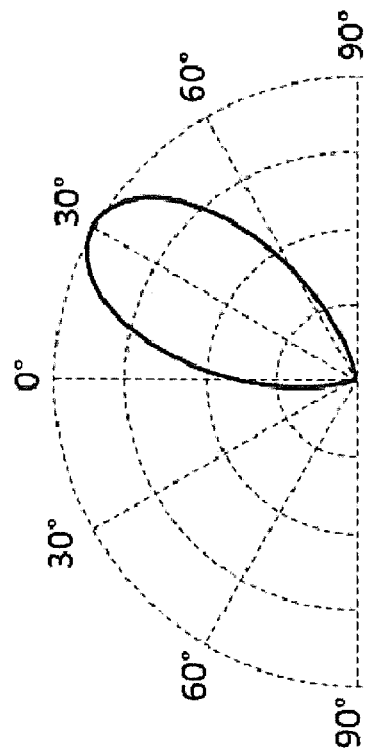
Figure 5C:
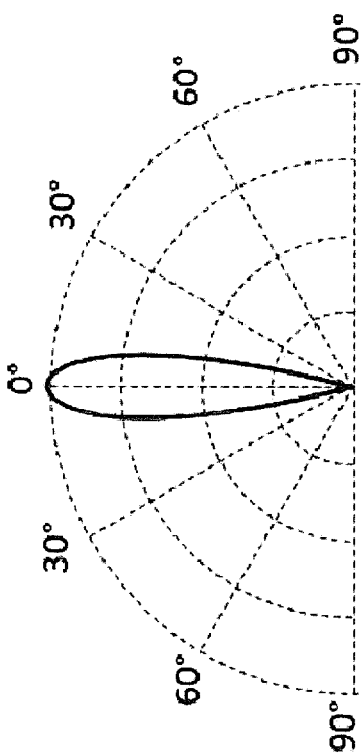
Figure 5D:
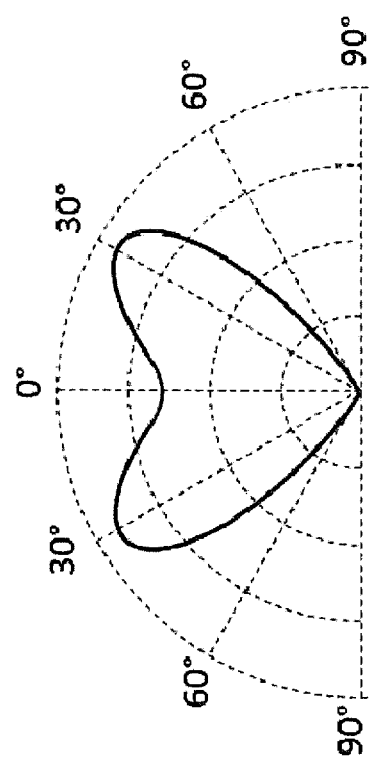

FIGS. 5A-5D show exemplary light distribution curves of the light decoupling by means of exemplary embodiments of the light deflection device according to the invention. In FIG. 5A, a substantially perpendicular (0°) light decoupling occurs in a comparably narrow angle segment, while in FIG. 5B a substantially perpendicular (0°) light decoupling occurs in a comparably wide angle segment. In FIG. 5C, an oblique light decoupling is, in contrast, represented in two directions (−30° and 30°), while in FIG. 5D, an oblique light decoupling is shown at an angle in only one direction (30°).

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A light deflection device, comprising:
   a flat, transparent light guide
   a microstructure provided at least in regions on the light guide for decoupling light coupled into the light guide, and
   a transparent cover layer applied flat at least in regions on the light guide,
   wherein the microstructure has microstructure elements and wherein the microstructure elements in each case have a substantially point-like geometry for contact with the light guide, wherein the width of the effective contact region of the microstructure elements with the light guide in the region of the substantially point-like geometry viewed in cross-section is at most 20 µm, wherein the microstructure is provided between the cover layer and the light guide, wherein the cover layer has the microstructure for decoupling light coupled into the light guide on the surface facing the light guide and wherein at least a part of the microstructure elements of the microstructure are convexly curved at least in sections viewed in cross-section.

2. The light deflection device according to claim 1, wherein at least a part of the microstructure elements of the microstructure are formed by separate microbodies.

3. The light deflection device according to claim 1, wherein at least a part of the microstructure elements of the microstructure are connected to the light guide by means of a bonding layer.

4. The light deflection device according to claim 1, wherein at least a part of the microstructure elements of the microstructure are impressed into the light guide.

5. The light deflection device according to claim 1, wherein at least a part of the microstructure elements of the microstructure are formed in a straight line at least in sections viewed in cross-section.

6. The light deflection device according to claim 1, wherein the microstructure for decoupling light coupled into the light guide is formed at least partially by at least one total reflection within the microstructure elements.

7. The light deflection device according to claim 1, wherein the microstructure for decoupling light coupled into the light guide is formed transversely to the surface of the light guide.

8. The light deflection device according to claim 1, wherein the microstructure elements of the microstructure have at least in sections a substantially constant or varying arrangement density.

9. An illumination device, comprising:
   a light deflection device according to claim 1 and
   at least one illumination source arranged on at least one edge of the light guide for coupling in light via the edge of the light guide.

10. Use of an illumination device according to claim 9 for a space-creating structural element, for a room light, for a lamp outdoors, for a lamp in vehicles or for display illumination.

11. Use of a light deflection device according to claim 1 for a space-creating structural element, for a room light, for a lamp outdoors, for a lamp in vehicles or for display illumination.

12. The light deflection device according to claim 1, wherein the width of the effective contact region is at most 10 µm.

13. The light deflection device according to claim 1, wherein the width of the effective contact region is at most 5 µm.

14. A method for manufacturing a light deflection device, the method comprising the steps:
   providing a flat, transparent light guide
   providing the light guide with a microstructure for decoupling light coupled into the light guide, and
   applying a flat, transparent cover layer at least in regions on the light guide, wherein the microstructure is provided between the light guide and the cover layer,
   wherein the microstructure has microstructure elements, wherein the microstructure elements in each case have a substantially point-like or line-like geometry for contact with the light guide, wherein the width of the effective contact region of the microstructure elements with the light guide in the region of the substantially point-like geometry viewed in cross-section is at most 20 µm, wherein the cover layer has the microstructure for decoupling light coupled into the light guide on the surface facing the light guide and wherein at least a part of the microstructure elements of the microstructure are convexly curved at least in sections viewed in cross-section.

15. The method according to claim 14, wherein the microstructure elements of the microstructure are provided by separate microbodies, which are arranged between the cover layer and the light guide.

16. The method according to claim 14, wherein the provision of the light guide with the microstructure includes at least partially adapting at least a part of the microstructure elements in the region of the substantially point-like or line-like geometry to the light guide.

17. The method according to claim 14, wherein the provision of the light guide with the microstructure includes at least partially impressing at least a part of the microstructure elements in the light guide.

18. The method according to claim 14, the method further comprising:
   applying a bonding layer to the light guide,
   wherein the provision of the light guide with the microstructure includes at least partially immersing at least a part of the microstructure elements into the bonding layer.

19. The method according to claim 14, wherein the width of the effective contact region is at most 10 µm.

20. The method according to claim 14, wherein the width of the effective contact region is at most 5 µm.

* * * * *